UNITED STATES PATENT OFFICE.

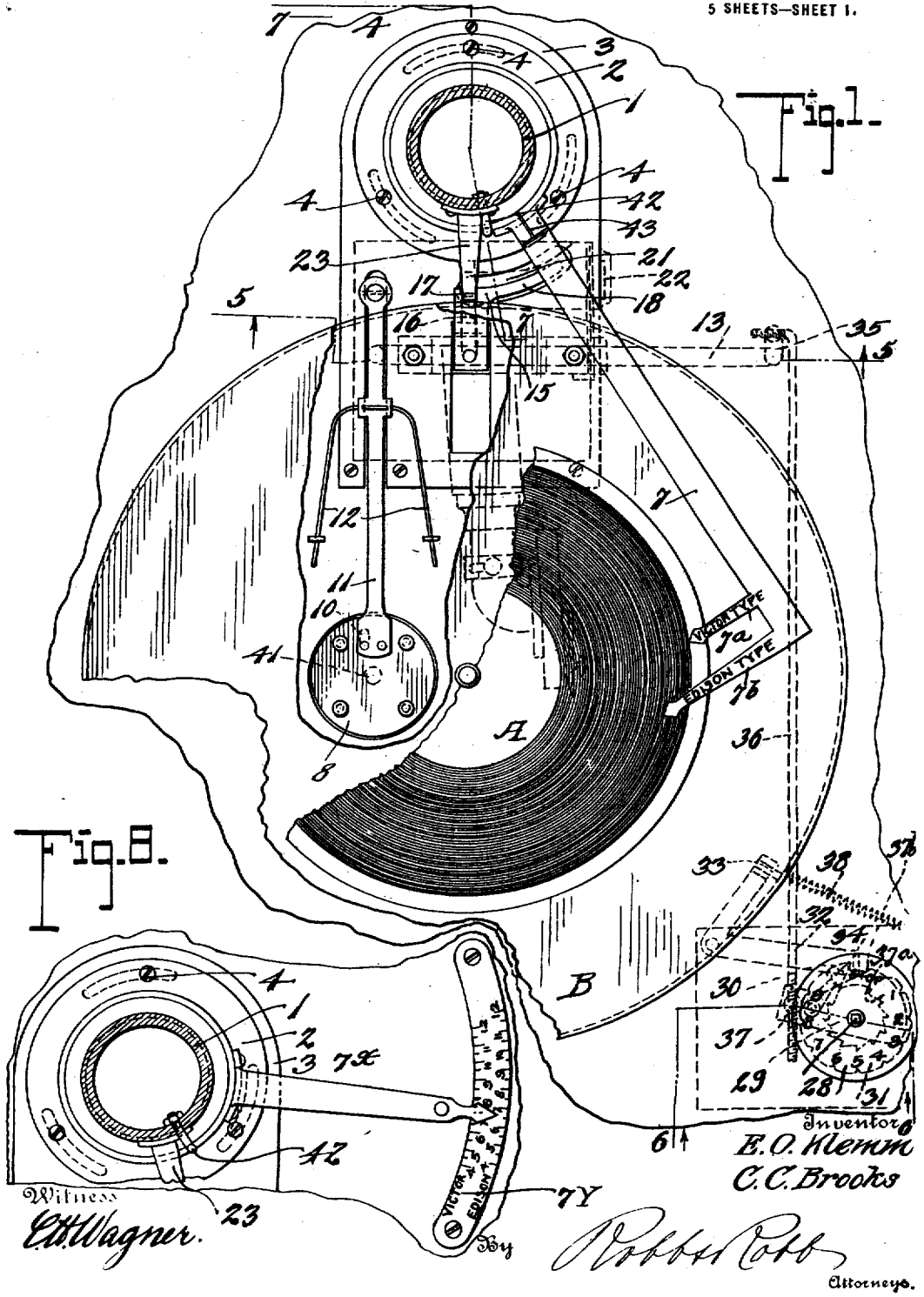

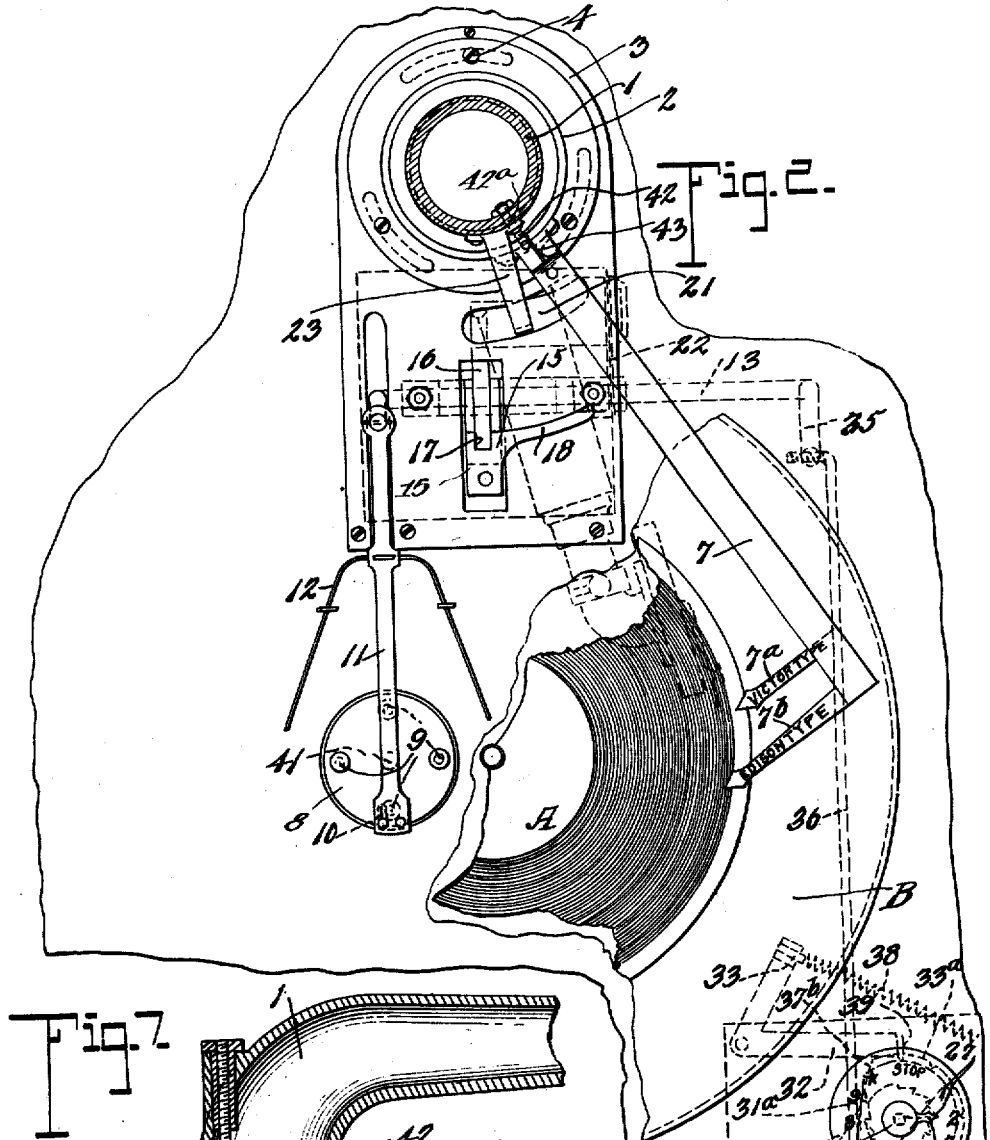
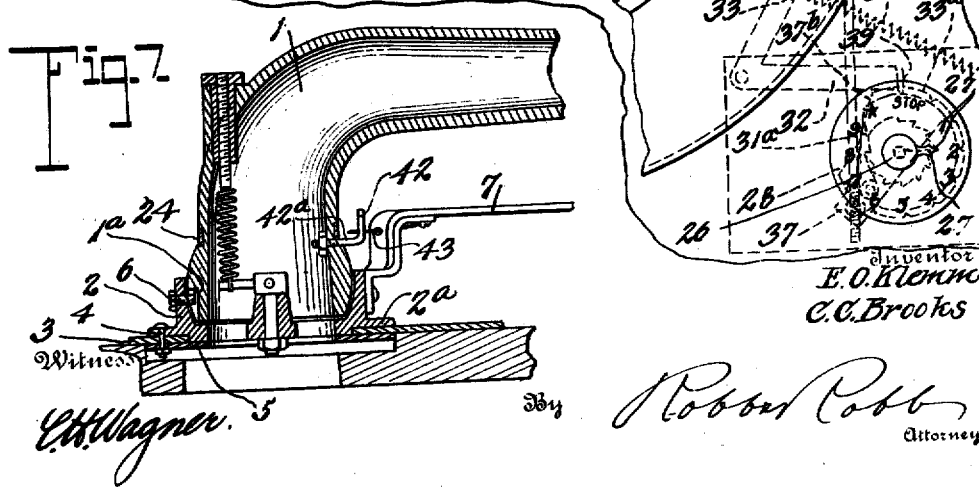

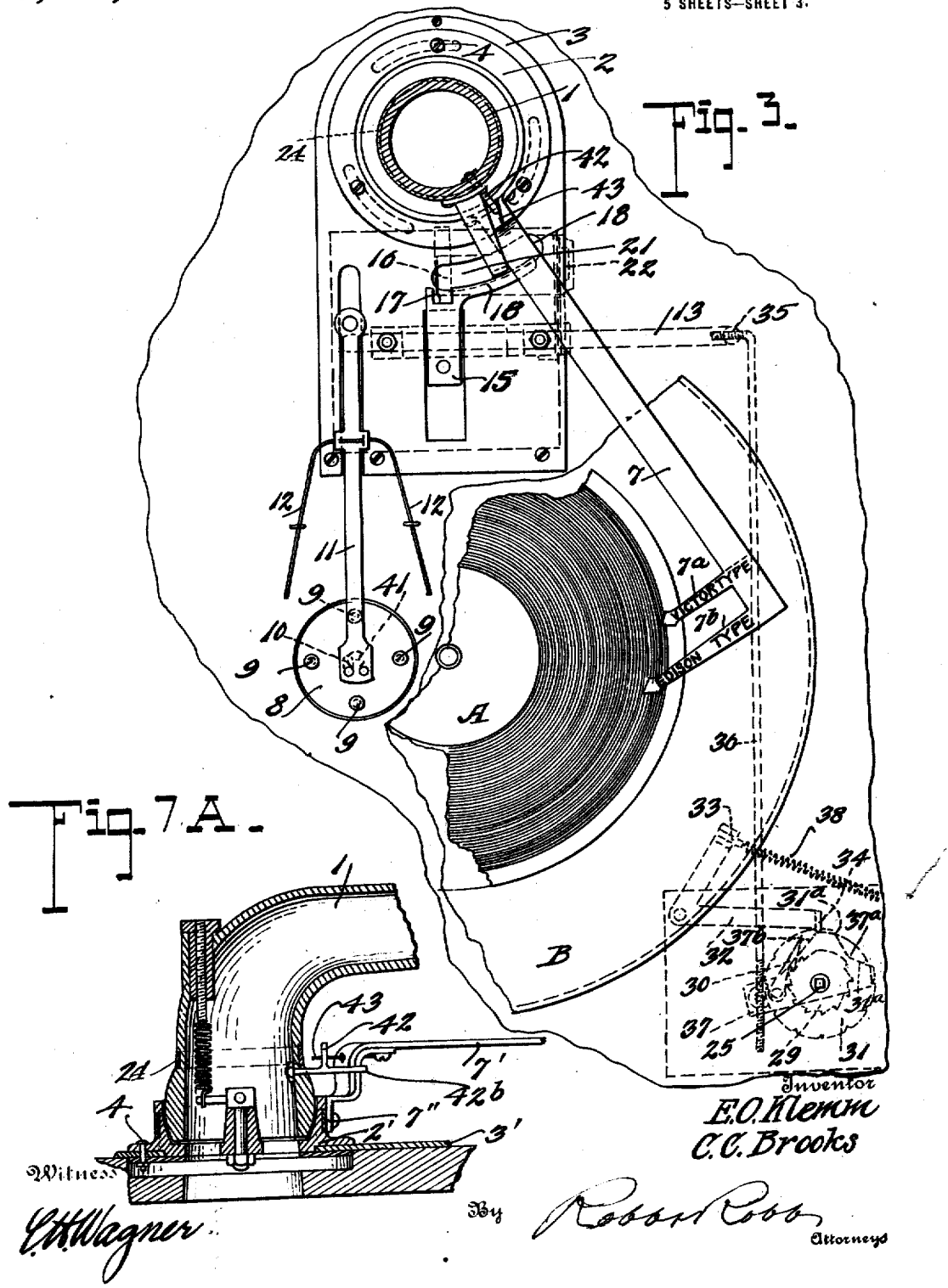

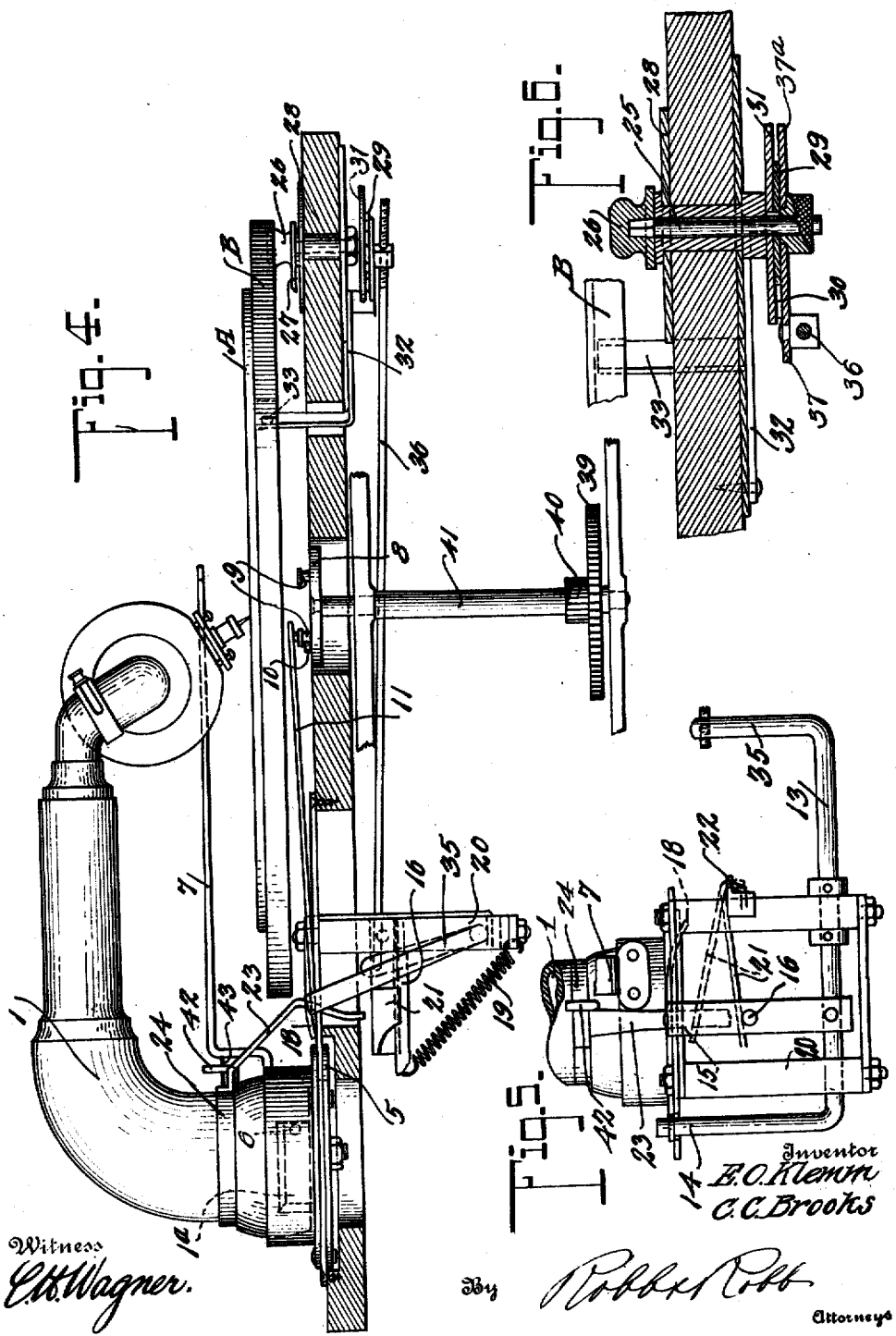

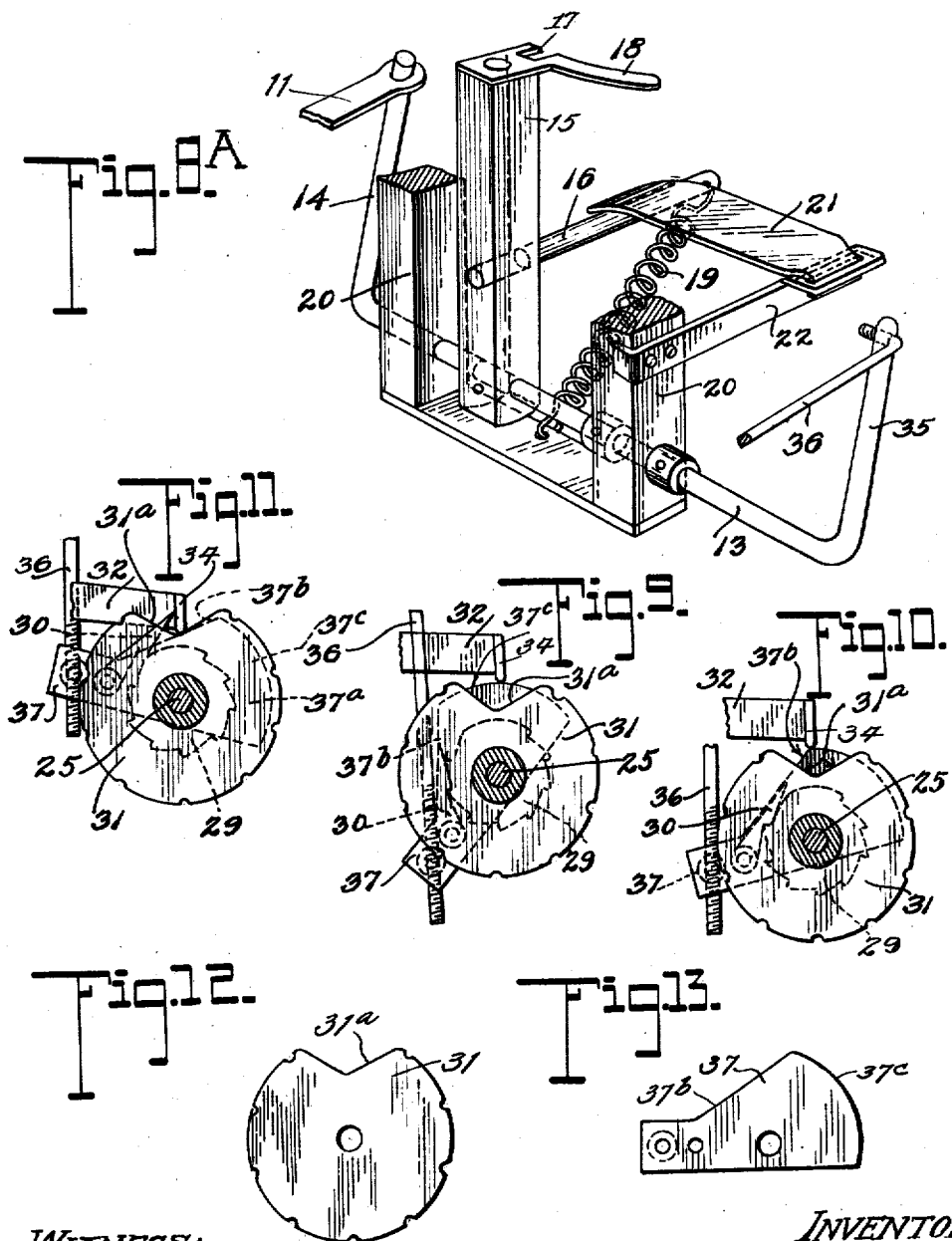

CLIFFORD C. BROOKS AND EDWIN O. KLEMM, OF SAGINAW, MICHIGAN, ASSIGNORS TO KLEMM MANUFACTURING COMPANY, OF SAGINAW, MICHIGAN.

AUTOMATIC STOP AND REPEATING MEANS FOR GRAPHOPHONES.

1,406,605.  Specification of Letters Patent.  Patented Feb. 14, 1922.

Application filed May 29, 1917. Serial No. 171,790.

*To all whom it may concern:*

Be it known that we, CLIFFORD C. BROOKS and EDWIN O. KLEMM, citizens of the United States, residing at Saginaw, in the county of Saginaw and State of Michigan, have invented certain new and useful Improvements in Automatic Stop and Repeating Means for Graphophones, of which the following is a specification.

This invention appertains to a type of automatic stopping and repeating mechanism for sound reproducing machines, which has been heretofore developed by us and which includes as the primary features thereof, the following units of mechanism: First, an actuating device for lifting the reproducer from a point of discontinuance of reproduction of a record and depositing the same at a point of commencement or reproduction; second, a driver, preferably operated from the motor of the talking machine and a connector to connect said driver with said actuating device; third, an operation predetermining device adapted to be set to start the turn-table or record carrier and co-operative with the other mechanisms to control stopping of the reproduction, continuous reproduction by way of repeating operations of the reproducer, and one or more operations of the reproducer according to the number of reproductions of a record which may be desired; and fourth, a reproduction commencement point controller and indicator adjustable to accommodate for reproduction of records of different sizes and for the reproduction of different portions of such records.

The general arrangement, co-operation, and some details of the invention, as hereinafter presented, form the subject matter of other patent applications made by us, so that it suffices to state that the improvements of this invention involve particular features of novelty residing in the peculiar reproducer actuating means employed by us, and special mounting and adjusting means for the said controller and indicator; and certain detail improvements in the operation predetermining device and other parts useful as single or conjoint mechanisms depending upon whether our improvements are employed for automatic stopping purposes, for reproduction repeating purposes, or automatic stopping and repeating control operations.

In the accompanying drawings:

Figure 1 is a plan view of a talking machine with the turn-table and record thereon broken away, showing certain controlling parts, the tone arm being illustrated in section and in dotted lines and the mechanism being arranged as when the record carrier is stopped and the reproduction discontinued;

Figure 2 is a view somewhat similar to Figure 1, the dotted line position of the tone arm showing same in the act of being deposited upon the record at the point of commencement of sound reproduction;

Figure 3 is a view similar to Figure 1, the illustration of the tone arm being that depicting same in its operation of traversing the record;

Figure 4 is a vertical sectional view through the top board of the talking machine, the tone arm and supporting parts illustrated in elevation;

Figure 5 is a sectional view taken about on the line 5—5 of Figure 1;

Figure 6 is a sectional view on the line 6—6 of Figure 1;

Figure 7 is a sectional view taken about on the line 7—7 of Figure 1; and;

Figure 7ᵃ is a view similar to Figure 7 illustrating a modification.

Figure 8 is a fragmentary plan view showing a modified form of the reproduction commencement point controller and indicator.

Figure 8ᴬ is a perspective view showing a portion of the reproducer lifting and timing devices as found in the illustration in Figure 5.

Figures 9 to 11 inclusive are fragmentary plan views showing the different positions assumed by the parts of the operation predetermining and controlling device under practical conditions of use.

Figures 12 and 13 are respectively plan views of the disk and pawl carrier parts forming a part of the operation predetermining device.

*Mounting of the reproducer arm.*

Reference is particularly made to Figures 1, 4, and 7, from which it will be noted that the reproducer or tone arm 1 is pivotally and rotatively supported in the socket member 2 so that the tone arm may be lifted upward slightly as well as swung horizontally in the customary way. The socket member 2 is supported by rotative adjustment on a stationary base plate 3, fastenings 4 passing through openings in a flange 2ᵃ of the socket member 2, through slots of arc shape formed in the plate 3, and through openings in a circular plate or ring 5, beneath the plate 3. The arm 1 is formed at its pivoted portion with a recess 1ᵃ, see Figures 4 and 7, and a screw 6 carried by the socket member 2 forms a stop, entering said recess 1ᵃ, and adapted to engage the end wall of said recess to limit the outward swinging movement of the tone arm.

*Reproduction commencement point controller.*

This controller comprises the controlling and indicating arm 7, rigidly secured to the socket member 2, as shown best in Figure 7, said arm 7 having pointers 7ᵃ and 7ᵇ, co-operative directly with the record A upon the record carrier B, as will be later more fully explained. By moving the arm 7, the socket member 2 may be turned to a predetermined adjustment, whereby to shift the stop 6 carried by the member 2, thus to correspondingly control the degree of outward swinging of the tone arm 1.

*The driver.*

The driver embodies a drive wheel 8, having vertical studs 9 thereon engageable with a projection 10 on the inner end of a connector or link 11, the latter being normally held in the position shown in Figure 1, by a flat spring 12, assuming that the normal condition of the machine is stopped.

*The reproducer lifting and actuating device.*

This device is shown in top plan view in Figures 1 to 3 inclusive, and in elevations in Figures 4 and 5. The actuating means comprises a rock-shaft 13, having at one end the rocker arm 14, the upper end of which is secured to the connector 11. Intermediate the ends of the shaft, there is rigidly supported thereby an operation control or timing lever 15, which consists of a vertical portion from which projects the horizontal lifting arm 16, see Figure 4. The lever 15 has a horizontal portion, seen best in Figure 1, formed with a notch 17 and having a lateral extension 18. The lifter arm 16 is normally held at the downward limit of its movement by a spring 19, see Figure 4, said spring being connected with the outer end of said arm, and with a U-shaped bracket 20, the latter provided with bearings for the shaft 13. The lifting arm 16 engages beneath a lifting and incline plate 21, the latter being pivoted at 22, to a suitable supporting bracket. Above the plate 21 is disposed the vertical depending end portion of a trip member 23, see Figures 1, 4 and 5, especially.

The member 23 depends from a ring 24, which surrounds the tone arm just above the socket member 2, see Figure 7. The ring 24 is intended to fit snugly about the arm 1 in frictional engagement therewith, such that the ring or member 24 will turn with the arm 1 when the arm 23 is not locked against turning. The frictional engagement between the parts 1 and 24, however, permits the arm 1 to be moved whilst the parts 23 and 24 remain relatively stationary, so that the reproducer arm may be swung horizontally over the record A without a corresponding movement of the parts 23 and 24. When the lifting plate 21 is raised by the arm 16, it will assume an inclined position, engaging the member 23. The lifting action of the plate on engagement thereof, with the member 23, is capable of lifting the arm 1 to reset the reproducing stylus. Once the plate 21 is inclined, the lower engaging end of the member 23 will cause the elevated tone arm 1 to travel outwards to a point of reproduction commencement, as an incident to the sliding action of the lower end of the member 23 on the now inclined plate 21.

*The operation predetermining device.*

This device is similar to those which have heretofore evolved in connection with mechanism of the type of this invention. It is seen best in Figure 6, and consists of a shaft 25 with a turning handle 26 at its upper end. From the handle 26 extends a pointer 27 co-operative with indicia on a dial 28, the lower end of the shaft 25 carries a ratchet wheel 29, with which co-acts a pawl 30. The wheel 29 is fixed to the shaft 25, and above the wheel is a disk 31 having a notch 31ᵃ therein. Co-operative with the disk 31 is a brake lever 32, see Figure 1, said lever having a brake shoe 33 at one end to engage the rim of the record carrier B and hold said carrier against rotation. These brake parts form reproduction discontinuing means. The other end of the lever 32 has a projection 34 co-acting to hold the pawl 30 out of engagement with respect to the ratchet wheel 29, except when the rod 36 hereinafter mentioned moves toward the pawl to actuate the same. The projection 34 is adapted to enter the notch 31ᵃ of the disk 31, when said disk is turned by the handle 26 to what is called stopping position of the operation predetermining device. The end of the shaft 13 opposite that having the arm 14, has an arm 35 connected by the rod 36 with an adjustable pawl carrier 37, which supports the pawl 30. The carrier 37 has an extension 37ᵃ provided with a curved edge 37ᶜ and an inclined edge portion or flat 37ᵇ, co-operative with the projection 34 on the brake lever 32 in a manner later to be set forth. A spring 38 tends to pull the brake shoe 33 into braking position, respecting the record carrier.

As regards the pawl 30, and reference is especially made to Figures 9 to 11, the projection 34 of the lever 32 and the disk 31 with its notch 31ª, the following relations should be understood. Normally, when the machine is stopped the notch 31ª being opposite to and receiving the projection 34 permits the shoe 33 to engage the carrier B to maintain the same stationary. Except when the rod 36 is shifted positively in the direction of the pawl carrier 37 to cause back feed of the ratchet wheel 29, the pawl 30 contacts with the projection 34 and is thereby held so that the engaging nose of the pawl is just out of the path of the teeth of the wheel 29. Therefore, when the machine is at rest, the handle 26 may obviously be turned in either direction without interference from the pawl. The same is true when the machine is in operation excepting at the particular moment when the rod 36 is actuating the pawl 30 to cause engagement thereof with the wheel 29 for the back feed action.

The brake lever 32 is of course adapted to be held in unapplied position by the coaction of the projection 34 with any portion of the periphery of the disk 31 except the notched part 31ª. But under practical conditions of operation hereinafter described the notch 31ª may arrive opposite the projection 34 of the lever 32 without braking action of the latter if at such time the pawl carrier 37 is in a position with the curved edge 37ᶜ thereof opposite the projection 34. This is due to the fact that the edge 37ᶜ is just as effective as the unnotched part of the disk 31, as regards holding the brake shoe 33 unapplied. Thereafter, the pawl carrier 37 is susceptible of movement to an extreme position assumed by it when the machine stops, such as shown in Figure 1, wherein its flat 37ᵇ is opposite the projection 34 and thus the part 37 offers no obstacle to the movement of the lever 32 to brake applying position, assuming of course the disk 31 has been returned to its normal position with the notch 31ª opposite the projection 34. Accordingly it must be understood that for stopping of the turn table or carrier B the parts must be adjusted as seen in Figures 1 and 11, namely with the flat 37ᶜ and notch 31ª opposite the projection 34 of the brake lever.

*General operation of the mechanisms.*

As seen in Figure 1, the record carrier B supports thereon an eight inch record A. If the reproducer of the tone arm 1 is adjusted on the tone arm for reproducing Victor type records, the shorter pointer 7ª of the controller indicator 7 may be positioned by the operator, as seen in Figure 1, opposite the outer smooth portion of the record, or at any point between the inner and outer ends of the record. At whatever point this pointer 7ª is positioned over the record, at this point the reproducer will be deposited on the record for reproduction commencement. This is due to the fact that the stop 6 is adjusted corresponding with the adjustment of the pointer 7ª, whereby to obtain the result described. Figure 7 shows the stop 6 at the extreme adjustment for limiting outward movement of the reproducer say for a large sized record on the carrier B. If the indicator 7 were moved inward somewhat the end of the recess 1ª remote from the stop 6 would abut the stop sooner than according to the adjustment of Figure 7, thereby shortening the swing of the reproducer. With the parts as in Figure 1 the operator may freely manipulate the tone arm 1 in opposite directions or as necessary to position the reproducer at any desired point in the length of the record and leave the reproducing stylus at such point on the record. This has been done according to Figure 1, with the stylus deposited at the inner end of the record, but the action just described is to be understood as the action which predetermines the point where the reproduction of the record will be discontinued, whether for automatic stopping of the machine, or automatic repeating, it matters not which.

If the operator now turns the handle 26 to move the pointer 27 opposite the number "2" on the dial 28, the disk 31 will carry the projection 34 out of the notch 31ª so that the projection rides on the periphery of the disk and the brake shoe 33 is thus released from the carrier B and the latter starts to rotate.

The record carrier B now starts to turn, and simultaneously, through the gear 39, and the pinion 40, the shaft 41 carrying the driver 8, begins to rotate. One of the pins 9 of the driver 8 promptly engages the projection 10 of the connector.

The said connector is now pulled upon to rock the shaft 13. This operation lifts the plate 21 to an inclined position and simultaneously tilts the locking and timing lever 15 so as to disengage its notch 17 from the trip member 23, which has previously been held against turning movement with the tone arm 1 by said notch engagement. The member 23 is released practically at the same time with the lifting of the plate 21, so that the plate is free to slightly elevate the reproducer arm 1, to lift its stylus from the record A, and after that the plate, by reason of its inclination and the gravitation of the arm, causes the arm to move outwards to bring the reproducer to the point of commencement of reproduction as determined by the controller or indicator and during this operation the rod 36 is forced toward the predetermining device causing the pawl 30 to turn the disk 31 back, carrying the pointer 27 from "2" to "1" on dial 28.

At a certain point in the turning movement of the driver 8, the pull on the connector 11 is relieved thus lowering the reproducer and the rock-shaft 13 rocks back toward its normal position until the outer edge of the lateral extension 18 of the timing lever 15 engages the outer side of the trip member 23. The said engagement is such as to maintain the connector 11 substantially in the position shown in Figure 3, wherein the pins 9 do not act upon the projection 10, as shown in Figure 3. The said engagement also prevents complete return movement of the rod 36 and causes said rod to maintain the pawl carrier with the edge 37ᶜ thereof opposite the projection 34 of the brake lever 32, see Figure 2. The several parts including shaft 13 are prevented from complete normalizing by detaining action of the trip member 23. When the trip the arm 1 to the caused to be moved with previously determined point of discontinuance of reproduction, said trip member 23 will be opposite the notch 17 of the timing lever 15. On reaching said position, the lever 15 will obviously be pulled outwards away from the center of the record A by the action of the spring 19, giving the shaft 13 a normalizing rocking movement. This movement of the shaft 19 brings the connector 11 to a position in which its projection 10 is again in the path of movement of a pin 9. A single reproduction of the record has now been completed and the connector 11 coacting with the driver 8 again lifts the reproducer and causes it to be carried to the reproduction commencement point, accompanied by a second movement of the disk 31 by the rod 36 as above referred to. This movement of the disk 31 moves pointer 27 from "1" to a point midway of "1" "Stop" on dial 28 and brings the notch 31ᵃ of the disk opposite the projection 34 of the brake lever and pointer 27 to stopping position. The projection 34. however, is kept from moving into said notch 31ᵃ by the free outer end or edge 37ᶜ of the pawl carrier extension 37ᵃ, the latter having been rocked into the path of the projection 34 by the movement of the rod 36 that caused pawl 30 to turn the disk 31 to stopping position, and said edge 37ᶜ remains engaged with the projection 34, keeping it out of the notch 31ᵃ, because the trip 23 by coaction with extension 18 does not permit enough movement of the rod 36 toward the shaft 13 to shift the edge 37ᶜ from the projection 34. Under these conditions, therefore, the driver 8 will again operate the connector 11 and the various parts will go through the second reproduction cycle of operation as above set forth. When the reproducer reaches the point of discontinuance of reproduction a second time with the member 15 opposite the notch 17, shaft 13 will rock and the rod 36 will be pulled upon again, by action of the spring 19 a distance equal to the depth of the notch 17, thereby rocking the pawl carrier 37 slightly clockwise and causing the incline 37ᵇ of the pawl carrier extension 37ᵃ to move opposite the projection 34. The above action completed, said projection 34 now freed from the part 37ᶜ enters the notch 31ᵃ, simultaneously permitting applying of the brake shoe 33, and causing stoppage of the turn-table or record carrier B before another one of the pins 9 on the driver has time to engage the projection 10 of the connector 11.

According to the foregoing, it will be apparent that the arrangement of the disk 31 is such that the rod 36 and pawl 30 act upon the disk when the connector 11 is being positively moved by one of the pins 9 of the driver 8, so that the spring 19 does not have to possess very much tension to properly cooperate with the rock-shaft 13. If the return movement of the member 31 were caused incident to normalizing movement of the shaft 13, the spring 19 would obviously have to be sufficiently strong to do this work, and this would be highly disadvantageous because, under such conditions, the strength of the spring would create so much friction between the parts 18 and 23 as to cause a tendency of the reproducing stylus to jump out of the sound groove when the record is being played, or in other words, the friction might at times so retard the reproducer that it would not follow the track of the record. The foregoing will make clear the desirability of utilizing the positive drive of the member 18 to restore the disk 31 of the operation predetermining device. Furthermore, owing to the co-operation of the pawl 30 with the projection 34 on the brake lever, it will be apparent that the handle 26 may be operated to turn the pointer 27 in either direction to set the disk 31 as quickly as possible at the desired adjustment to control the number of operations, one to nine in the present instance, for which the machine may be set. In controlling reproduction of the record if the pointer 27 is set at the star indication on the dial 28, the record will be repeated until the machine runs down, the ratchet wheel 25 having a tooth omitted opposite the star indication, rendering the pawl 30 ineffective to restore the disk 31 and set the machine.

It will be obvious from the foregoing explanation that owing to the fact that the timing lever 15 through its notch 17 locks the trip member 23 to prevent the latter from moving during the preliminary manipulation or depositing of the reproducer, there is always maintained, as between the point of depositing of the reproducer, and the adjustment of the member 23, a constant relation. Thus no matter how far outwards the reproducer swings to its point of commencement of reproduction, carrying therewith the member 23, the member 23 will always enter the notch 17 at the time when the reproducer reaches the point where it was preliminarily left deposited on the record, owing to which action and adjustment, the point of discontinuance or reproduction is predetermined.

It will be obvious, furthermore, from the foregoing that by merely moving the controller 7 inwards or outwards to adjust the stop 6, the point where reproduction will commence, or the point where the reproducer will start to co-act with the record A may be correspondingly predetermined.

As the reproducer is swung outwards by the actuating means, including the plate 21 the L-shaped projection 42, (see Figure 7) carried by the arm 1, will engage a light, straight spring 43 on the indicator arm 7 practically simultaneously with engagement of stop 6 with the left end wall of the recess 1ª as seen in Fig. 4, and the action of said spring 43 will be to tend to force the tone arm inwards to insure movement of the stylus thereof on to the record groove of the record A for the stylus is deposited on the smooth outermost portion of the record. The relation of parts 6 and 43 in position and movement is always constant. The projection 42 is pivoted at 42ª so that it may be turned slightly whereby the tension of the spring 43 may be varied according to requirements. This feature is advantageous because when playing the Pathé or Edison records, there is not as much force required to carry the needle from the uncut surface of the record to the first sound groove as when playing the Victor or Columbia types of records.

As shown in Figure 7ª, the projection 42 on the reproducer arm 1 has an extension 42ᵇ, adapted to engage directly with the controller arm 7. In this figure, the construction is modified to the extent that the socket member 2′ is fixed to the base plate 3′, and the controller arm 7′ is carried by a ring 7″, surrounding the member 2′ in frictional engagement therewith. Relative adjustability of the parts 7′ and 2′ in Figure 7ª is substantially the same as in respect to Figure 7. The projection 42 has been provided with the extension 42ᵇ so that the latter will strike against the arm 7′ which, under these conditions, is utilized practically for the purpose of the stop 6, previously described, to thereby limit the extent of outward swinging of the reproducer in bringing the latter to its reproduction commencement point. The projection 42 co-acts with the spring 43, as before set forth.

As regards Figure 8, the modification illustrated affords an alternative form of indicator or controller arm 7ˣ, directly fixed to the socket member 2 and having a pointer to co-act with a double dial plate 7ʸ. The indicia upon the latter being comprised of markings to facilitate adjustment of the member 7ˣ at reproduction commencement point controlling positions for both Victor and Edison type records.

Having thus described our invention, what we claim as new is:

1. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to render the locking member inactive during other movement of said arm, said arm being adapted to control restoration of the locking member to locking relation respecting the trip, and reproduction discontinuing means controlled by said locking member.

2. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, an operation predetermining device to render the locking member inactive during other movement of said arm, said arm being adapted to control restoration of the locking member to locking relation respecting the trip, and reproduction discontinuing means controlled by said locking member.

3. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to carry the reproducer arm to a position of reproduction operating to render the locking member inactive previous to such carrying movement, and reproduction discontinuing means controlled by said locking member.

4. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to carry the reproducer arm to a position of reproduction operating to render the locking member inactive previous to such carrying movement, the locking member having a part to hold the locking means inactive until the arm reaches a reproduction discontinuance position.

5. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to carry the reproducer arm to a position of reproduction operating to render the locking member inactive previous to such carrying movement, the locking member having a part to hold the locking means inactive while the reproducer traverses the record and until the arm reaches a reproduction discontinuance position.

6. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to return the reproducer arm to a position of reproduction operating to render the locking member inactive previous to such return movement, reproduction discontinuing means controlled by said locking member, means to vary the extent of the carrying movement of the reproducer arm including a socket member in which the arm is supported to rise and swing, a stop on said socket member co-operative with the arm to limit its swinging movement, and means to adjust the socket member to shift the stop thereon.

7. In a sound reproducing machine, the combination with a record carrier, and reproducer adapted to traverse a record on said carrier and comprising an arm movable toward and from the reproduction commencement point of the record, means to vary the movement of the arm in reaching the reproduction commencement point including a movable socket member in which the arm is supported to rise and swing, a stop on said socket member cooperative with the arm and means to adjust the socket member to shift the stop thereon.

8. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to render the locking member inactive during return movement of said arm, said arm being adapted to permit restoration of the locking member to locking relation respecting the trip and reproduction discontinuing means controlled by said locking member.

9. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to render the locking member inactive during other movement of said arm, and reproduction discontinuing means controlled by said locking member, the locking member having means co-acting with the trip whereby the locking member is maintained inactive until the reproducer arm has traveled to a reproduction discontinuance point on the record.

10. In a sound reproducing machine, the combination with a record carrier, and reproducer adapted to traverse a record on said carrier and comprising an arm, of a trip connected to move with the arm, a locking member co-acting with the trip to hold the same stationary during certain movement of the reproducer arm, means to render the locking member inactive during other movement of said arm, and reproduction discontinuing means controlled by said locking member, the locking member having a timing extension engaging the trip when the latter is unlocked whereby the locking member is maintained inactive until the reproducer arm has traveled to a reproduction discontinuance point on the record.

11. In a sound reproducing machine, the combination with a record carrier, and reproducer adapted to traverse a record on said carrier and comprising an arm, reproduction discontinuing means, a locking member, a trip on the reproducer arm locked by said locking member, means to move the arm to a reproduction commencement point on the record adapted to release the trip from the locking member, a connection between the trip and arm such that the trip moves with the arm only when the trip is released, and means whereby the reproduction discontinuing means is maintained inoperative whilst the trip is moving with the arm.

12. In a sound reproducing machine, the combination with a record carrier, and reproducer adapted to traverse a record on said carrier and comprising an arm, reproduction discontinuing means, a locking member, a trip on the reproducer arm locked by said locking member, means to move the arm to a reproduction commencement point on the record adapted to release the trip from the locking member, a connection between the trip and arm such that the trip moves with the arm only when the trip is released, means whereby the reproduction discontinuing means is maintained inoperative whilst the locking member is released from the trip, and said discontinuing means rendered active under certain conditions when the trip moves to a position of locking coaction of the locking member.

13. In a sound reproducing machine, the combination with a record carrier, and reproducer adapted to traverse a record on said carrier and comprising an arm, reproduction discontinuing means, a locking member, a trip on the reproducer arm locked by said locking member, actuating means including a part engageable with the trip to move the arm to a reproduction commencement point on the record and instrumentalities adapted to release the trip from the locking member, a connection between the trip and arm such that the trip moves with the arm only when the trip is released, and means whereby the reproduction discontinuing means is maintained inoperative whilst the trip is moving with the arm.

14. In a sound reproducing machine, the combination with a record carrier, and reproducer adapted to traverse a record on said carrier and comprising an arm, of a trip connected to move with the arm, a single locking member co-acting with the trip to hold the same stationary during certain opposite movements of the reproducer arm, mechanism to render the locking member inactive during other movement of said arm, said arm being adapted to restore the locking member to locking relation respecting the trip, and reproduction discontinuing means controlling said mechanism and controlled by said locking member.

15. In a sound reproducing machine, the combination with a record carrier, and reproducer adapted to traverse a record thereon, of means for moving the reproducer to a reproduction commencement point relative to the carrier, means to limit said movement of the reproducer including a projection carried by the reproducer, the spring supported independently of the reproducer and adapted to lightly engage said projectiton, and means whereby to adjust said spring to vary the reproduction commencement point to which the reproducer is moved.

16. In a sound reproducing machine, the combination with a record carrier and a traveling reproducer arm associated therewith, of a support for said arm, a stop carried by said support and adapted to engage the arm and limit its movement in one direction, and means to adjust the support to vary the position of said stop.

17. In a sound reproducing machine, the combination with a record carrier and a traveling reproducer arm associated therewith, a support for said arm comprising a socket member and rotatable relatively to the arm, means to effect various rotative adjustments of said socket member, and a stop on the socket member engageable with the arm to limit its movement.

18. The combination with a record carrier and a travelling reproducer arm associated therewith, a driver, a trip mounted on the arm so that the arm may move independently of the trip, a rock-shaft, a locking lever mounted on said rock-shaft and engageable with the trip, a connector between the driver and the rock-shaft, and means to cause actuation of the rock-shaft by connector and driver to release the trip from said locking lever.

19. The combination with a record carrier and a travelling reproducer arm associated therewith, a driver a trip mounted on the arm so that the arm may move independently of the trip, a rock-shaft, a locking lever mounted on said rock-shaft and engageable with the trip, a connector between the driver and the rock-shaft, an incline plate engageable with the trip, and means to actuate said plate from said rock-shaft to incline the plate and thereby carry the reproducer arm to a point of reproduction commencement.

20. The combination with a record carrier and a travelling reproducer arm associated therewith, a driver, a trip mounted on the arm so that the arm may move independently of the trip, a rock-shaft, a locking lever mounted on said rock-shaft and engageable with the trip, a connector between the driver and the rock-shaft, an incline plate engageable with the trip, and means to actuate said plate from said rock-shaft to incline the plate and thereby carry the reproducer arm to a point of reproduction commencement, the last mentioned means being operable simultaneously with the release of the trip from said locking lever.

21. The combination with a record carrier and a travelling reproducer arm associated therewith, a driver, a trip mounted on the arm so that the arm may move independently of the trip, a rock-shaft, a locking lever mounted on said rock-shaft and engageable with the trip, means to cause actuation of the rock-shaft by said driver to release the trip from said locking lever, and reproduction discontinuing means controlled by said locking lever, the locking lever comprising a member to hold said reproduction discontinuing means inactive for a predetermined time after release of the trip.

22. The combination with a record carrier and a travelling reproducer arm associated therewith, a driver, a trip mounted on the arm so that the arm may move independently of the trip, a rock-shaft, a locking lever mounted on said rock-shaft and engageable with the trip, means to cause actuation of the rock-shaft by said driver to release the trip from said locking lever, reproduction discontinuing means controlled by said locking lever, the locking lever comprising a member to hold said reproduction discontinuing means inactive for a predetermined time after release of the trip, and means to restore the locking relation between the locking lever and trip after a predetermined amount of movement of the trip with the reproducer arm.

23. In combination, a rotative record carrier, a travelling reproducer arm associated therewith, a trip movable with said arm, a locking lever normally engaging said trip to prevent movement thereof with the arm, a driver, a rock-shaft connected with said locking lever and with said driver, means to simultaneously release the trip from the locking lever and move the trip to carry the arm to a reproduction commencement point, and reproduction discontinuing means operable from the rock-shaft as an incident to relative movement of the locking lever and trip.

24. In combination, a rotative record carrier, a travelling reproducer arm associated therewith, a trip movable with said arm, a locking lever normally engaging said trip to prevent movement thereof with the arm, a driver and a rock-shaft for connecting said locking lever and with said driver, to simultaneously release the trip from the locking lever and move the trip to carry the arm to a reproduction commencement point, and reproduction discontinuing means operable from the rock-shaft as an incident to relative movement of the locking lever and trip, the locking lever having means to co-act with the trip and maintain the reproduction discontinuing means inactive for a predetermined time after release of the trip from the locking lever.

25. In combination, a record carrier, a travelling reproducer arm associated therewith, means to drive said record carrier, a driver operable from the last mentioned means, a trip, means connecting the trip with said arm whereby the arm may move the trip and move independently of the trip, a rock-shaft, a locking member on said shaft, normally locking the trip, a connector between the rock-shaft and said driver, a controlling device for the carrier operable from said rock-shaft, and means operated by said locking member to actuate the trip to move the arm to a reproduction commencement point.

26. In combination, a record carrier, a travelling reproducer arm associated therewith, means to drive said record carrier, a driver operable from the last mentioned means, a trip, means connecting the trip with said arm whereby the arm may move the trip and move independently of the trip, a rock-shaft, a locking lever on said shaft, normally locking the trip, a connector between the rock-shaft and said driver, a controlling device for the carrier operable from said rock-shaft, and means operated by said locking lever to actuate the trip to move the arm to a reproduction commencement point, the locking lever having an extension cooperative with the trip to maintain the controlling means aforesaid in a position permitting operation of the record carrier a predetermined time after release of the trip from the locking lever.

27. In combination, a record carrier and a reproducer adapted to co-act with a record on said carrier, means to automatically cause reproduction discontinuance of said reproducer, an operation predetermining device movable in opposite directions to control the action of said automatic means, and connecting means intermediate the predetermining device and automatic means such that the former may be moved in either direction to a controlling adjustment during the use of the machine.

28. In combination, a record carrier and a reproducer adapted to co-act with a record on said carrier, means to automatically cause reproduction discontinuance of said reproducer and to cause repeating action of the reproducer, an operation predetermining device movable in opposite directions to control the action of said automatic means, and connecting means intermediate the predetermining device and automatic means such that the former may be moved in either direction to a controlling adjustment during the use of the machine.

29. In a sound reproducing machine, a sound box movable from positions of reproduction commencement to reproduction discontinuance, an arm connected to move with the sound box, operating means for said sound box adapted to shift it by frictional engagement with said arm, the movement of the operating means being such as to shift the sound box its maximum range of movement, the action of the operating means upon the sound box permitting the latter to stay stationary while the operating means continues to move in frictional engagement with the arm.

In testimony whereof we affix our signatures.

CLIFFORD C. BROOKS.
EDWIN O. KLEMM.